US007927388B2

(12) United States Patent
Pallmann (10) Patent No.: US 7,927,388 B2
(45) Date of Patent: Apr. 19, 2011

(54) APPARATUS AND METHOD FOR PRODUCING WOODFUEL BRIQUETTES, PELLETS, COMPOUNDS, AGGLOMERATES, GRANULATES, AND THE LIKE

(75) Inventor: Hartmut Pallmann, Zweibruecken (DE)

(73) Assignee: Pallmann Maschinenfabrik GmbH & Co. KG, Zweibruecken (DE)

( * ) Notice: Subject to any disclaimer, the term of this patent is extended or adjusted under 35 U.S.C. 154(b) by 442 days.

(21) Appl. No.: 12/021,288

(22) Filed: Jan. 28, 2008

(65) Prior Publication Data

US 2008/0115408 A1 May 22, 2008

Related U.S. Application Data

(62) Division of application No. 11/185,719, filed on Jul. 21, 2005, now Pat. No. 7,335,008.

(30) Foreign Application Priority Data

Jul. 21, 2004 (DE) .......................... 10 2004 035 260

(51) Int. Cl.
*C10L 5/00* (2006.01)
*C10L 5/06* (2006.01)
(52) U.S. Cl. .................. 44/598; 44/550; 44/590; 44/593
(58) Field of Classification Search ...................... 44/598, 44/550, 590, 593
See application file for complete search history.

(56) References Cited

U.S. PATENT DOCUMENTS

| 3,657,195 A | * | 4/1972 | Doerfel et al. | .................. 526/71 |
| 3,799,231 A | | 3/1974 | Boileau | |
| 3,799,234 A | * | 3/1974 | Skidmore | .................. 159/2.2 |
| 4,632,564 A | | 12/1986 | Kopernicky | |
| 4,828,573 A | * | 5/1989 | Jelks | .................. 44/577 |
| 4,834,777 A | * | 5/1989 | Endebrock | .................. 44/596 |
| 5,009,586 A | | 4/1991 | Pallmann | |
| 5,419,634 A | | 5/1995 | Bacher et al. | |
| 6,129,873 A | | 10/2000 | Shelby et al. | |
| 7,335,008 B2 | * | 2/2008 | Pallmann | .................. 425/203 |

FOREIGN PATENT DOCUMENTS

| DE | 3210974 | | 10/1983 |
| DE | 3842072 | C1 | 12/1989 |
| DE | 19706374 | A1 | 8/1998 |
| EP | 0090373 | A2 | 10/1983 |
| JP | 11245283 | A * | 9/1999 |

* cited by examiner

*Primary Examiner* — Ellen M McAvoy
*Assistant Examiner* — Taiwo Oladapo
(74) *Attorney, Agent, or Firm* — Muncy, Geissler, Olds & Lowe, PLLC (57) ABSTRACT

An apparatus and a method for producing woodfuel briquettes, pellets, compounds, composites, agglomerates, or granulates as source material for subsequent processing in injection molding or extrusion processes, includes a pressing screw with screw spirals, which rotate around a longitudinal axis and which are arranged inside a screw shell. The feed material is conveyed to the pressing screw via a feed chute located at an input side. At the end of the pressing screw, processing tools are arranged, to which the feed material is conveyed by the rotating screw spirals. In the area of the processing tools, the residual moisture in the feed material evaporates due to the heat generated during the processing procedure, and is vented as a steam flow from the apparatus through the screw shell. In order to prevent the steam flow from carrying away part of the feed material, the apparatus includes an expansion chamber, through which the escaping steam flow is channeled, and the flow-through cross section of which is such that it causes the steam flow to decelerate. As a result of the deceleration of the steam flow in the expansion chamber, the particles of the feed material that were carried off by the steam flow can be returned to the feed material.

21 Claims, 5 Drawing Sheets

APPARATUS AND METHOD FOR PRODUCING WOODFUEL BRIQUETTES, PELLETS, COMPOUNDS, AGGLOMERATES, GRANULATES, AND THE LIKE

This application is a divisional of U.S. application Ser. No. 11/185,719, which was filed on Jul. 21, 2005, now U.S. Pat. No. 7,335,008, and which claims priority under 35 U.S.C. §119(a) to German Patent Application No. DE 102004035260, which was filed in Germany on Jul. 21, 2004, and which is herein incorporated by reference.

BACKGROUND OF THE INVENTION

1. Field of the Invention

The present invention relates to an apparatus and a method for producing woodfuel briquettes, pellets, compounds, composites, agglomerates, or granulates.

2. Description of the Background Art

Feed material for the production of woodfuel briquettes, pellets, compounds, composites, agglomerates, or granulates, is most often of free-flowing consistency. The feed material is typically conveyed to processing tools by a pressing screw, where it is processed in accordance with its intended use.

To produce simple products, for example, woodfuel briquettes or pellets, it is sufficient to compress the feed material, for example, wood (saw dust, wood fiber, wood chips), and to subsequently press it through a molding tool. The qualitative expectations from such a product are thereby relatively low. The production of high-quality granulates and agglomerates from homogeneous feed material, for example, PE granulate, requires higher constructive expenditures. After compressing, the dry feed material is thereby conveyed to an agglomerator or an extruder.

In this context, the production of composite materials, primarily of thermoplastic synthetics and wood, which are marketed, for example, as window frames, and construction and furniture parts, is an area that is becoming increasingly important. The production of these composite materials is most often done in a two-step procedure, whereby in a first step, the various components, for example, wood (saw dust, wood fiber, wood chips), synthetics and bonding agents, are mixed together and fed into an agglomerator, hot mixer, or extruder. The granulates, agglomerates, compounds, or composites thus produced serve as source material for subsequent extrusion processes.

All above-mentioned processing methods start with an intensive compression of the feed material, which causes substantial heat generation due to the high pressure and intensive frictional forces. In the processing of thermoplastic synthetics, this causes a plasticizing of the feed material, and furthermore to the forming of granulates and agglomerates.

If at the input side, thermoplastic synthetics are mixed with additional materials, for example, wood, the thermoplastic synthetics form a mushy to gooey matrix after plasticization, in which the further materials are embedded. The compounds thus produced then serve, as previously described, as source material for injection molding and extrusion apparatuses to produce construction and building materials of wood-like appearance. To improve the quality of the compounds, additives, for example, bonding agents, are frequently added to the feed material, which promote a wetting of the various components during the plasticization phase.

Quality problems with the product to be produced occur on a regular basis when water is conveyed with the feed material to the compression and processing zones. Due to the high temperatures prevalent there, water evaporates instantly and causes the formation of bubbles in the product to be produced. The resulting high pore volume contradicts the original idea of maximum compacting. Furthermore, porous intermediate products have a high abrasion tendency, which makes their further processing in subsequent processing stages questionable or even impossible.

In order to avoid problems caused by the penetration of moisture or water, it is known to dry each type of feed material in separate dedicated drying devices prior to processing. The disadvantage of this procedure is the high cost resulting from maintaining suitable drying devices and the additional expenditure of keeping the operation running.

In connection with the agglomeration of scrap plastics, a method and an apparatus is known from DE 197 06 374, whereby the heat generated during the agglomeration process is utilized to evaporate the residual water in the accumulated plastic scrap. By applying systematic loosening-up measures, the flow resistance on the input side is lowered such that the developing steam escapes from the agglomerator away from the conveying direction of the feed material. By systematically channeling the steam to an injection condenser, a transition of the steam to a liquid aggregation state is made. The condensed matter is collected in the condenser and is suctioned off with a pump.

Using this method and this apparatus, plastic scraps can be dried and agglomerated in one processing step. In connection with fine and fine-grained feed materials, however, it was found that steam escaping away from the conveying direction picks up fine particles of the feed material, which, apart from the loss of feed material, causes further complications in the subsequent processing operation.

Another conventional method and corresponding apparatus is disclosed in DE 32 10 947 A1. In this device, the feed material is compressed in a conical screw press before it is finally forced through a slot or ring constriction, where its highest compression is attained. During the initial compression, water is mostly squeezed off in the area of the pressing screw. Developing steam escapes through a perforated pipe section that is attached to the pressing screw. After condensation, the steam, together with the squeezed-off water, is removed.

SUMMARY OF THE INVENTION

It is therefore an object of the present invention to provide an apparatus and a method, wherein even fine and fine-grained feed material that is found in residual water can be processed into woodfuel briquettes, pellets, compounds, composites, agglomerates, granulates, and the like, without lowering the quality of the product and without having to suffer any loss of feed material.

The invention is based on the idea to vent the steam that is developing during the processing of the feed material away from the conveying direction to prevent quality losses. However, fine and fine-grained feed materials pose the problem, that particles of the feed material are carried away by the steam flow. The present invention makes it possible to detach these particles from the steam flow and to return them to the feed material. For this purpose, the steam flow is decelerated such that the lifting power of the steam flow is less than the effect of gravity on the particles. This allows the feed material that is carried away by the steam flow to drop and to gather.

For this purpose, an apparatus of the present invention includes an expansion chamber, which has a comparatively larger flow-through cross section than the pressing screw. Initially, this causes the flow-through resistance in this area to drop, which promotes a steam flow in the direction of the expansion chamber. In addition, the comparatively higher flow-through cross section causes a deceleration of the flow, thus allowing the dropping of the floating feed material. The individual process parameters must be selected such that condensation of the steam does not occur in the expansion chamber because otherwise, the water extracted from the feed material would get back into the feed material. In the course of successive cycles, more and more water would accumulate, which ultimately would cause operational breakdowns.

In a beneficial embodiment of the invention, the expansion chamber is designed as part of the screw shell. This provides a short and direct path for the steam flow, which allows a direct dropping of the carried-along particles onto the conveyor system of the apparatus.

Further preferred is an upstream, vertical flow through the expansion chamber, which is the most effective method of recovering the floating particles. The efficiency thus attained allows a space-saving, compact construction of an apparatus according to the present invention.

A closest-possible proximity of the expansion chamber to the processing tools results in minimizing the distance between the source of the steam and the area of escape so that the flow-through resistance of the steam is kept as low as possible. The short distance has the additional effect that the steam flow has little opportunity to pick up feed material from the material conveyor.

In a further preferred apparatus, the side walls of the expansion chamber are essentially arranged vertically. This gives the floating or dropping particles little opportunity to settle and gather on horizontal or slanted surfaces. This measure contributes to a minimizing of the maintenance costs.

Preferably, at least one side wall of the expansion chamber can be folded up or detached to ensure access to the expansion chamber for maintenance or repair work. In addition, this type of construction allows outside air to be channeled into the expansion chamber. The use of warm or hot air is thereby particularly beneficial because it works against possible condensation.

Tests have shown that at a flow speed in the expansion chamber of maximal 5 meters per second, preferably at 3 meters per second, an almost total retrieval of the feed material from the steam flow is possible. Although lower flow speeds improve the rate of deposition; however, they require larger expansion chambers. Higher flow speeds, on the other hand, result in an increased quantity of feed material in the steam flow after its exit from the expansion chamber, thus increasing the loss of feed material.

In an embodiment of the invention, the steam passing through the expansion chamber is channeled directly into the ambient air, which completely absorbs the water contained in the steam. The special merits of this embodiment are its simplicity in construction and operation, together with high operational safety.

In a further embodiment, the expansion chamber is attached to a low pressure system. The low pressure thereby promotes the steam flow in the direction of the expansion chamber. In a continuation of this idea, the steam flow is channeled to a filter with the aid of the low pressure, where residual particles of the feed material, which are still present in the steam flow, are separated and returned to the feed material. For this purpose, the filter is preferably connected to the feed chute via a downpipe.

Preferably, the low pressure is produced by a exhaust fan, which on its intake side is connected to the filter. In order to prevent condensation of the steam in the expansion chamber, the low pressure lines, or the filter, an adjustable air inlet is provided between the exhaust fan and the filter, according to an embodiment of the present invention. This air inlet allows the systematic and adjustable entry of outside air into the low pressure system, which also can be warm air, if need be. In this way, the low pressure can be kept at a level that allows optimal flow speeds to prevail in the expansion chamber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The embodiments illustrated in the drawings show an apparatus of the present invention in the form of an agglomerator without limiting the invention thereto. The invention can as well be used in combination with an extruder, compactor or compressor, as described in DE 32 10 974 A1, for example, or with similar devices.

Figure 1:
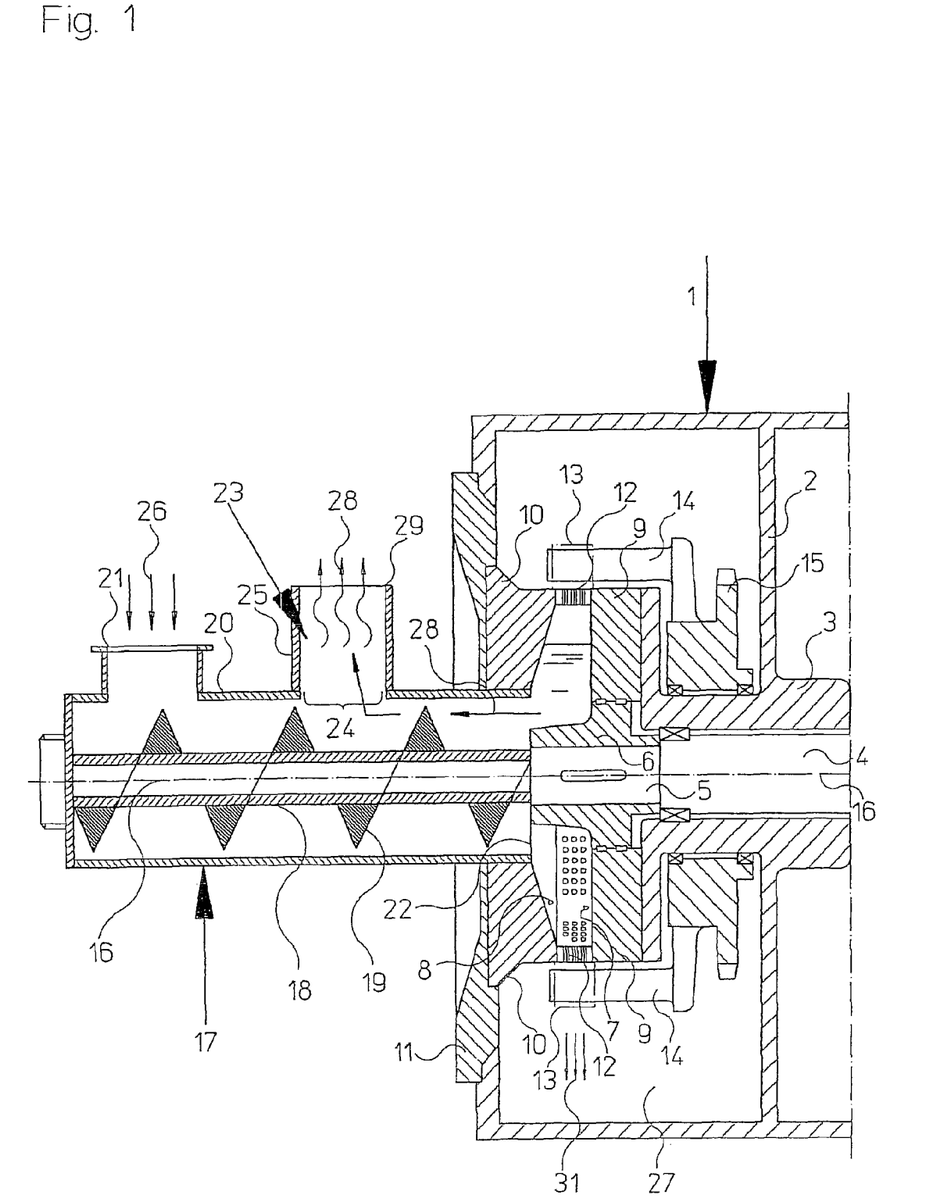
FIG. 1 is a longitudinal cross section of an embodiment of the present invention.

To begin with, an agglomeration apparatus is shown in FIG. 1, details of which are known from DE 38 42 072 C1, which corresponds to U.S. Pat. No. 5,009,586, and which is incorporated herein by reference. Essentially, a cylindrical housing 1 that encloses the agglomerating zone, is shown. The housing 1 has a rear wall 2, the central area of which is constructed as a horizontal housing bushing 3. The housing bushing 3 serves as a horizontal rotatable mount for a drive shaft 4, which is only partially shown, and which ends in a shaft journal 5.

Arranged on top of the shaft journal 5 is a rotor hub 6, from which two diametrically opposed pressing blades 7 extend into a disk-shaped annular chamber 8. The annular chamber 8 is restricted by a rear annular wall 9, which is fixedly attached to the housing 1, and a front annular wall 10, which is part of a swing-out housing cover 11. In its periphery, the annular chamber 8 is enclosed by a perforated die 12, which, together with the effective edges of the rotating pressing blades 7, is doing the actual agglomeration work.

The exterior of the perforated die 12 is swept by two rotating knives 13, which are adjustably and exchangeably attached to knife holders 14. The knife holders 14 are arranged on a knife holder hub 15, which in turn is rotatably positioned at the outer periphery of the housing bushing 3.

Central to the housing cover 11 and jointly pivotable, a pressing screw 17 is mounted as an extension of a rotational axis 16. The pressing screw 17 has a screw shaft 18, which extends coaxially with the rotational axis 16, with a singleturn screw spiral 19 rotating thereon. The screw spiral 19, in turn, is enclosed by a screw shell 20. At the free end of the pressing screw 17, a vertical feeder chute 21 leads into the screw shell 20, whereas at the opposite end, the screw discharge 22 extends into the annular chamber 8 of the agglomerator.

In the area between the feeder chute 21 and the housing cover 11, in very close proximity to the housing cover 11, is an expansion chamber 23, which extends upwards in a substantially vertical direction in relation to the rotational axis 16. The expansion chamber 23 is formed by an opening 24 in the screw cover 20, and is enclosed by vertical side walls 25. In the present embodiment, the expansion chamber has a rectangular cross section, however, the cross section thereof can be any shape, for example circular, elliptical, square, etc. The side walls, which are plane-parallel to the illustration plane, emerge tangentially from the screw shell 20, that is, the cross-section measurement of the expansion chamber 23 transversal to the screw shaft 16 equals the diameter of the screw shell 20. The minimum height of the expansion chamber 23 depends on the sedimentation behavior of the feed material. It should be made certain that the individual particles are able to drop inside the expansion chamber 23.

The apparatus illustrated in FIG. 1 works as follows. The feed material, as indicated by arrows 26, is conveyed via the feeder chute 21 to the area of the pressing screw 17, where it is pushed by the rotating screw spirals 19 into the disk-shaped annular chamber 8. The feed material can be a mixture of, for example, saw dust and thermoplastic granulates.

The pressing blades 17 rotating in the annular chamber 8 compress the feed material in the direction of the perforated die 12, which generates a considerable amount of heat due to the friction forces in action. This results in the plasticization of the thermoplastic part of the feed material, which in turn causes at least a partial wetting of the saw dust by the plastic synthetic material. This mushy to gooey mixture of saw dust and thermoplastic synthetic material is subsequently pressed radially outward through the holes in the perforated die 12, whereby an intensive mixing and compressing takes place. The agglomerate 31, which is thus formed on the outside of the perforated die 12, is cut off by the rotating knives 13, and is subsequently removed via the material output 27 at the bottom of the housing 1.

By conveying the feed material to the disk-shaped annular chamber 8, the chamber is heated up considerably due to the high temperatures generated in the agglomeration process so that the water retained in the feed material changes into a gaseous state of aggregation instantly, that is, it evaporates. The volume increase associated therewith generates steam pressure, which due to the prevailing flow resistances causes the steam to flow in an opposite direction from the conveyor direction of the screw spiral 19. In FIG. 1, the steam flow is referenced with the numeral 28. The lowest flow-through resistance is in the area of the expansion chamber 23 so that the steam flow 28 enters the expansion chamber 23, flows through it in a vertical direction, and escapes at its upper end through an opening 29, and disperses into the ambient air.

Due to the high flow speed, the steam flow 28 picks up fine particles from the feed material during its passage through the pressing screw 17 so that they are carried by the steam flow 28 into the expansion chamber 23. Owing to the larger flow-through cross section of the expansion chamber 23 as compared to the pressing screw 17, a systematic deceleration of the steam flow 28 takes place such that the effect of gravity on the particles of the feed material in the expansion chamber 23 is stronger than the sweeping power of the steam flow 28. Thus, the particles drop back into the pressing screw 17, where they are then channeled back into the agglomerating process by the screw spiral 19.

Figure 2:
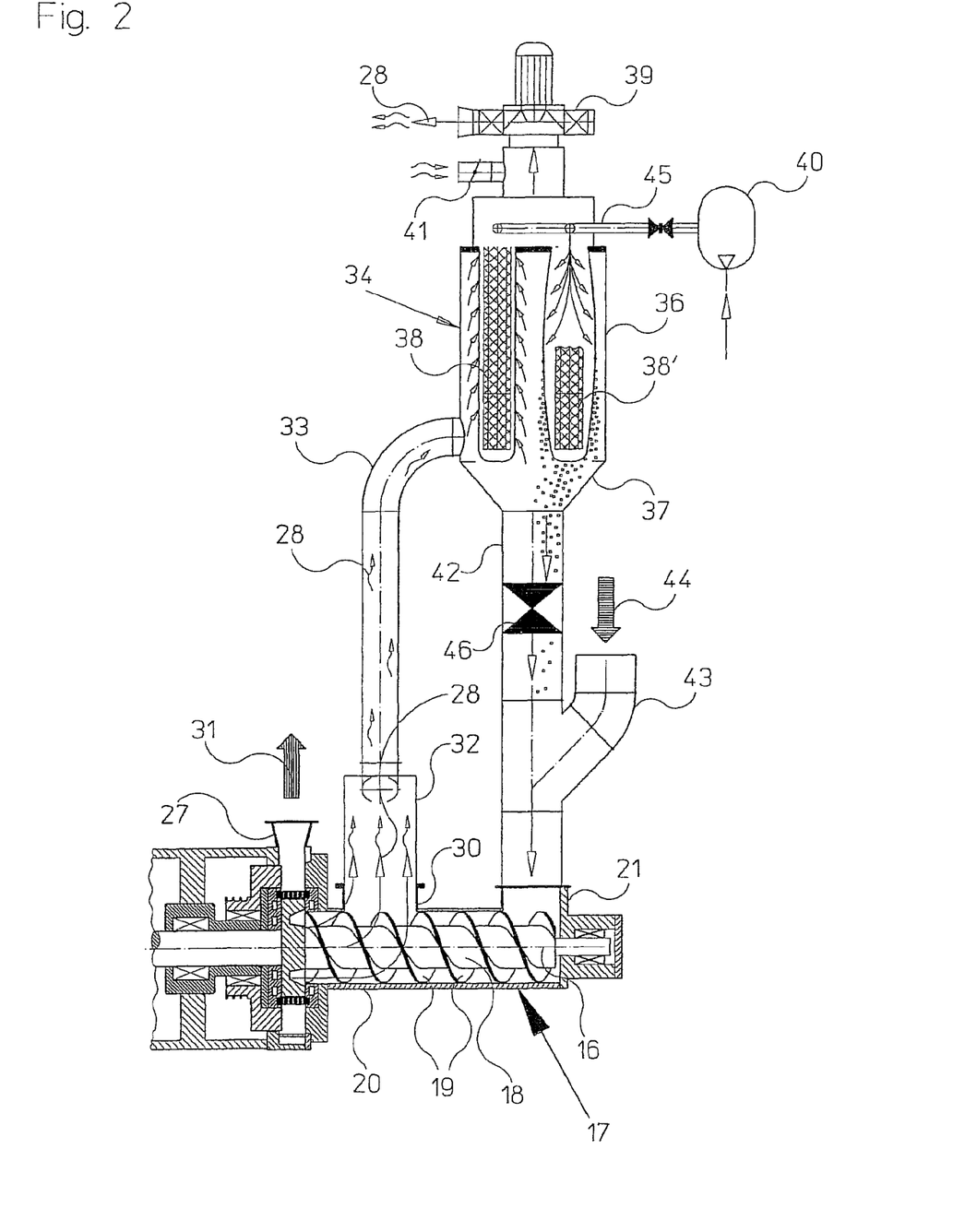
FIG. 2 is a longitudinal cross section of another embodiment of the present invention.
Figure 3:
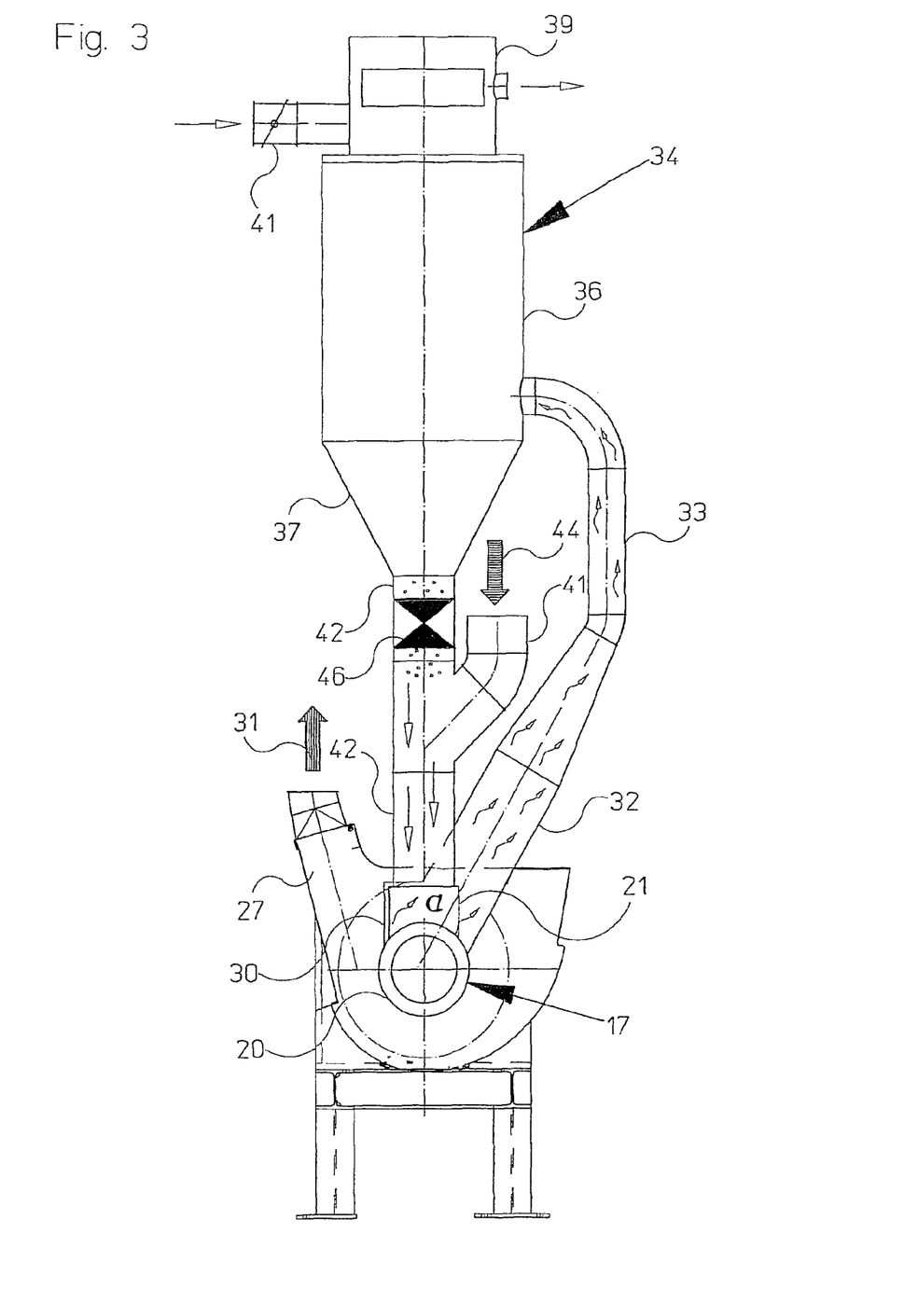
FIG. 3 is a front view of the apparatus illustrated in FIG. 2.

FIGS. 2 and 3 show a further embodiment of the apparatus described in FIG. 1. The agglomerator and the pressing screw are comparable to those in FIG. 1 so that the same reference numerals are used for the same components, and the description of FIG. 1 applies.

The additions illustrated in FIGS. 2 and 3 are essentially directed to the expansion chamber 30, which has been combined with further components to the apparatus. In contrast to FIG. 1, the expansion chamber 30 illustrated in FIGS. 2 and 3 is closed on the top and has an exhaust pipe 32 in this area, the longitudinal axis of which is inclined by the angle α against the vertical axis. Thus, the exhaust pipe 32 leads into the expansion chamber 30 at an angle, and with its lower wall forms an inclined side wall of the expansion chamber 30. The maximal size of the angle α has to be such that the feed material dropping through the exhaust pipe 32 does not settle and gather on the inclined surface, but slides downwards into the pressing screw 17.

A pipeline 33 of smaller diameter is connected to the exhaust pipe 32. The pipeline 33 ends in the housing of a filter 34. The filter housing is comprised of an upper cylindrical part 36 and a lower funnel-shaped filter leg 37 attached thereto. The cylindrical part 36 serves as a receptacle for vertically arranged filter elements 38, 38', which are illustrated in FIG. 2 only. FIG. 2 shows two different states of operation of the filter elements 38, 38', which always occur at different times. The filter element 38 illustrates the normal state of operation, whereby residual feed material is detached from the steam flow, whereas the filter element 38' illustrates the backwashing of the filter.

Above the filter 34, there is an exhaust fan 39, which is part of a primary air system and which has the function to generate a low pressure in the filter 34. The effect of the low pressure extends via the pipeline 33 to the expansion chamber 30 and the pressing screw 17. Located between the filter 34 and the exhaust fan 39 is an adjustable damper 41 to inject outside air, warmed up air, as the case may be, into the primary air system.

At its lowest point, the funnel-shaped filter leg 34 has an outlet, to which a downpipe 42 is attached. At its lower end, the downpipe 42 ends in the feeder chute 21 of the pressing screw 17 and can be closed with a sealing element 46. The sealing element 46, for example, a slide damper, a butterfly valve, or a cell sluice valve, is closed during regular operation and is only opened for backwashing the filter. To supply the pressing screw 17, a branch pipe 43, which is laterally arranged on the downpipe 40, is provided for the intake of the feed material, as is indicated by the arrow 44.

The functions of the agglomerator and the pressing screw 17 are similar to those described in FIG. 1 so reference is made to this part of the description. Accordingly, the steam flow 28 escapes from the agglomerator in a direction opposite to the conveyor direction of the pressing screw 17, which is supported by the low pressure generated by the exhaust fan 39. Due to the prevailing flow speed in the pressing screw 17, particles of the feed material in the pressing screw 17 are picked up by the steam flow 28 and carried to the expansion chamber 30. The larger flow-through cross section of the expansion chamber 30 causes a deceleration of the steam flow 28 with the result that most of the particles drop and are returned to the agglomerator by the screw spiral 19. However, a residue of fine and finest particles always remains in the steam flow 28.

After its exit from the expansion chamber 30, these fine and finest particles are carried by the steam flow 28 through the pipeline 33 to the filter 34. In the filter 34, a final separation takes place, whereby the particles are retained by the filter surfaces of the filter elements 38, whereas the cleansed steam flow 28, after passing through the filter elements 38 and the exhaust fan 39, escapes into the ambient air.

After a period of operation, a decrease of the effective filter surface of the filter elements 38 can be observed, which can be noted in an increased energy consumption of the exhaust fan 39 at constant low pressure, or a decrease of the low pressure in the expansion chamber 30 at constant exhaust fan operation. To clean the filter elements 38, they are backwashed at appropriate time intervals. By activating the secondary air system, compressed air from the compressed air duct 40 is thereby blown via the backwash lines 45 into the filter elements 38. The forced reversal of the flow direction through the filter causes the fine and finest particles on the surface of the filter elements 38 to dislodge and to drop into the funnel-shaped filter leg 37 by force of gravity. With the sealing element 46 opened, they drop through the downpipe 42 into the feeder chute 21 of the pressing screw 17, which closes the material cycle and completely retrieves the portion of the feed material that was carried off by the steam flow 28.

Figure 4:
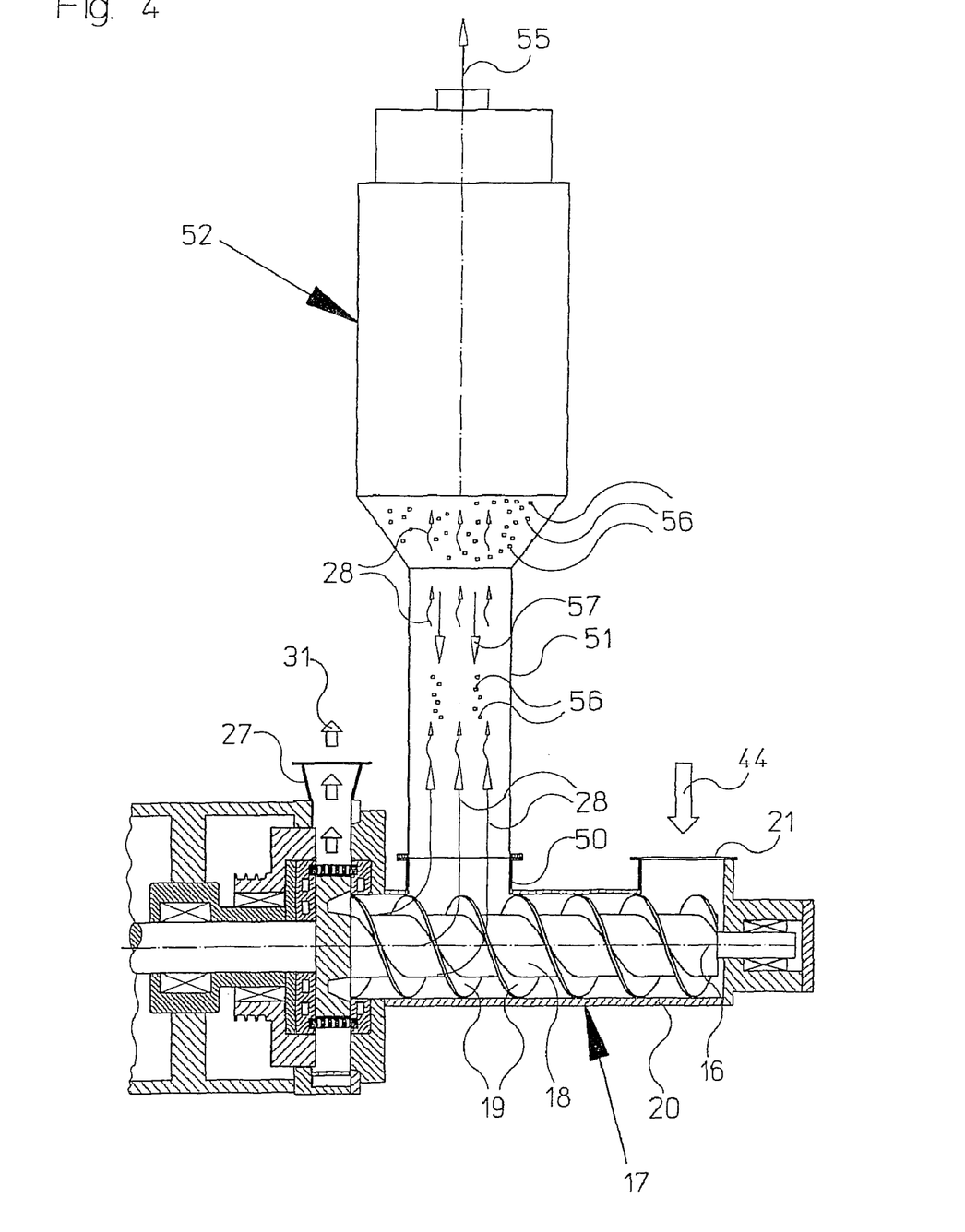
FIG. 4 is a longitudinal cross section of another embodiment of the present invention.
Figure 5:
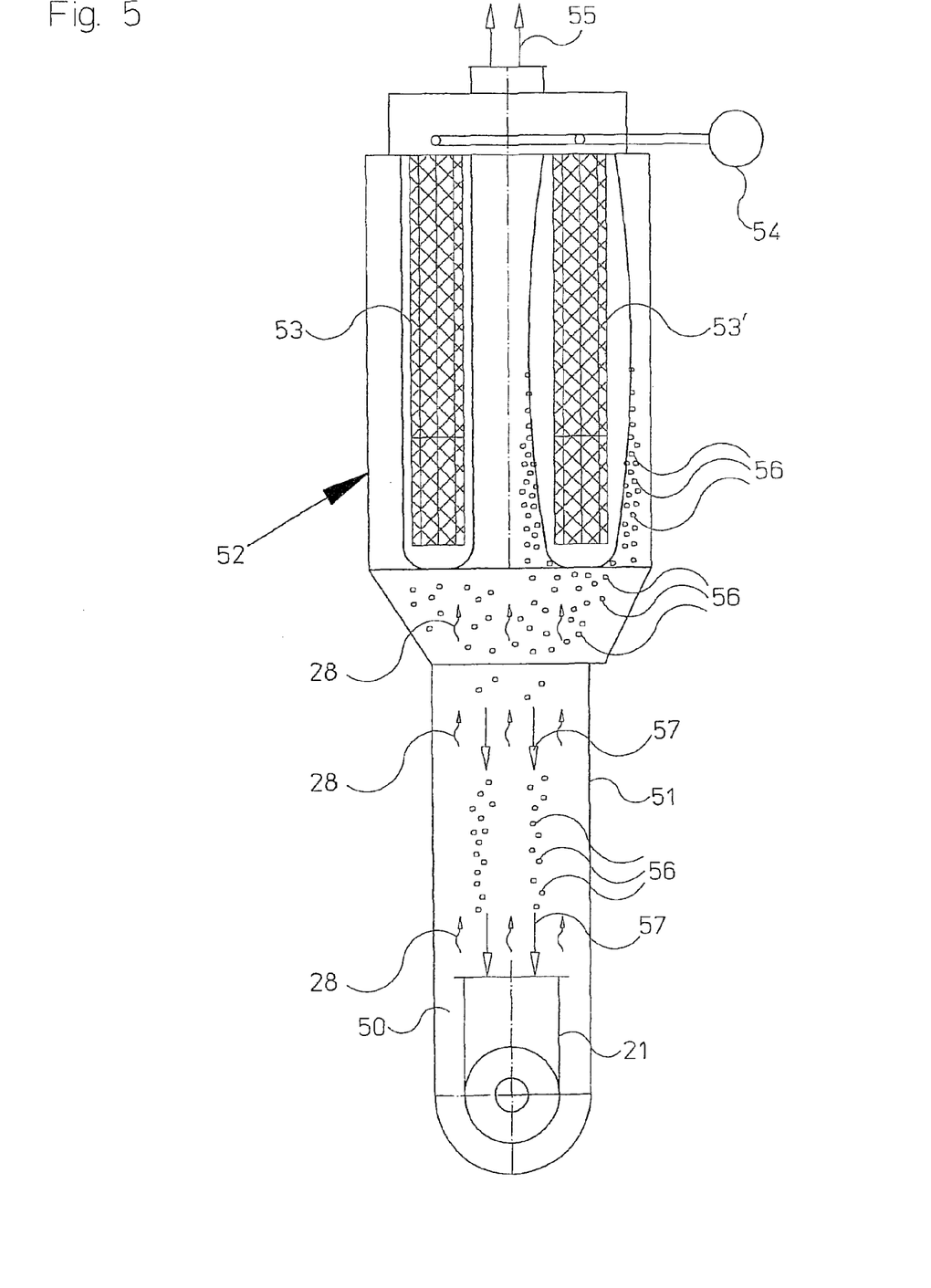
FIG. 5 is a cross section along the line V-V of the apparatus illustrated in FIG. 4.

FIGS. 4 and 5 illustrate a third embodiment of the invention. Agglomerator and pressing screw are thereby also identical to those previously described so that once again identical reference numerals are used for identical parts, and reference is made to corresponding sections of the descriptions for FIGS. 1 to 3.

In the apparatus according to the present invention, as illustrated in FIGS. 4 and 5, the expansion chamber 50 is extended by a vertical duct 51 with an identical cross section, and ends with its upper end in a filter 52. The filter 52 is essentially the same as described in FIGS. 2 and 3, that is, the filter 52 includes filter elements 53, 53', which can be backwashed via a compressed-air system 54. Again, FIG. 5 illustrates two states of operation, namely, the normal filter operation with the filter element 53, whereas the filter element 53' illustrates the backwashing of the filter.

On its upper side, the housing of filter 52 is connected to a low pressure system, which is indicated by the arrow 55. As described in FIGS. 2 and 3, the low pressure system can include an exhaust fan, which is arranged directly by the filter, or a primary central low pressure source, which may also supply further components of other parts of the apparatus. In this embodiment, an intake of an outside air stream downward to the filter 52 may be provided as well. The effect of the low pressure extends via the duct 51 and the expansion chamber 50 all the way to the pressing screw 17.

The function of this embodiment of the invention is as follows. On its way to the pressing screw 17, the steam flow 28 sweeps up fine particles of the feed material and, supported by the low pressure, enters the expansion chamber 50. Due to the larger flow-through cross section, a deceleration of the flow 28 takes place, which allows the particles from the feed material to drop in an direction opposite to that of the steam flow. As a result of the upward extension of the expansion chamber 50 through the duct 51, there is more time and space for the feed material that is carried along by the steam flow 28 to detach itself from the steam flow 28.

Finest particles, however, continue to be carried by the steam flow 28 to the filter 52, where a final separation on the surface of the filter elements 53 takes place. In the course of the continuous flow 28 of steam through the filter elements 53, the moisture carried along in the steam flow 28 causes a gradual soaking of the finest particles attached to the filter elements 53. They form clumps, with the result that during backwashing of the filter elements 53', larger clumps, which are indicated in FIGS. 4 and 5 with the reference numeral 56, detach themselves from the surface of the filter elements 53. Due to their weight, the clumps 56 drop in an opposite direction to the steam flow 28 through the duct 51 and the expansion chamber 50 back into the pressing screw 17, as is indicated by the arrows 57.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing woodfuel briquettes, pellets, material, composites, agglomerates, or granulates, the method comprising the steps of:
    feeding a woodfuel feed material to a processing chamber,
    processing said material in said processing chamber under conditions wherein steam is formed from residual moisture in said material,
    venting said steam, upstream from said processing chamber as steam flow into the ambient air; and
    decelerating, during the venting of said steam, the speed of the steam flow for at least part of the way towards the ambient air,
    wherein said steam accumulates particles from the feed material, and
    wherein the particles accumulated within the steam are decelerated during the venting of said steam.

2. The method according to claim 1, wherein the maximum deceleration is 5 m/s.

3. The method according to claim 1, wherein a low pressure is generated by a low pressure source to sustain steam flow towards the ambient air.

4. The method according to claim 3, wherein, upstream from the low pressure source, air is added in adjustable quantities.

5. The method according to claim 1, wherein the steam flow is filtered to recover particulates present in said steam flow.

6. The method according to claim 5, wherein the filtered particulate material is combined with the feed material.

7. The method according to claim 1, wherein warm or hot air is added to the steam flow.

8. The method according to claim 7, comprising venting said steam into an expansion chamber to decelerate said steam, wherein the warm or hot air is added prior to entering, and/or in the expansion chamber.

9. The method according to claim 1, wherein the maximum deceleration is 3 m/s.

10. The method according to claim 1, wherein said woodfuel feed material is fed to said processing chamber through a conveying chamber.

11. The method according to claim 10, wherein said steam is vented upwardly from said conveying chamber.

12. The method of according to claim 1, wherein said conveying chamber includes a screw conveyor.

13. The method according to claim 1, wherein said steam is caused to pass into an expansion chamber from said conveying chamber to decelerate said steam.

14. The method according to claim 1, wherein said woodfuel feed material comprises saw dust, wood fiber and/or wood chips.

15. The method according to claim 1, wherein said woodfuel feed material is compacted, extruded, compressed or agglomerated in said processing chamber.

16. A method for producing woodfuel briquettes, pellets, material, composites, agglomerates, or granulates, the method comprising the steps of:
- feeding a woodfuel feed material to a processing chamber from a conveying chamber,
- processing said feed material in said processing chamber under conditions whereby steam is formed from residual moisture present in said feed material,
- venting said steam from said processing chamber to ambient air sequentially through said conveying chamber and an expansion chamber in communication with said conveying chamber to decelerate said steam and cause particulate material present in said steam to separate from said steam, and
- returning said separated particulate material to said conveying chamber.

17. The method according to claim 16, wherein said woodfuel feed material comprises saw dust, wood fiber and/or wood chips.

18. The method according to claim 16, wherein the maximum deceleration is 5 m/s.

19. The method according to claim 16, wherein the steam flow is filtered to recover particulates present in said steam flow after being decelerated.

20. The method of according to claim 16, wherein said conveying chamber includes a screw conveyor.

21. The method according to claim 1, wherein the steam and the particles accumulated within the steam are decelerated in an expansion chamber.

* * * * *